(12) United States Patent
Gates, II et al.

(10) Patent No.: US 6,501,867 B2
(45) Date of Patent: Dec. 31, 2002

(54) CHIRP COMPENSATED MACH-ZEHNDER ELECTRO-OPTIC MODULATOR

(75) Inventors: John VanAtta Gates, II, New Providence, NJ (US); Douglas M. Gill, Hoboken, NJ (US); Robert W. Smith, Allentown, PA (US)

(73) Assignee: Lucent Technologies Inc., Murray Hill, NJ (US)

( * ) Notice: Subject to any disclaimer, the term of this patent is extended or adjusted under 35 U.S.C. 154(b) by 52 days.

(21) Appl. No.: 09/836,599

(22) Filed: Apr. 17, 2001

(65) Prior Publication Data

US 2002/0159666 A1 Oct. 31, 2002

(51) Int. Cl.[7] .............................. G02F 1/035; G02F 1/05
(52) U.S. Cl. ............................................. 385/2; 385/8
(58) Field of Search ........................... 385/2, 8, 15, 129

(56) References Cited

U.S. PATENT DOCUMENTS

| | | | |
|---|---|---|---|
| 4,820,009 A | * 4/1989 | Thaniyavarn | .................. 385/2 |
| 5,267,336 A | * 11/1993 | Sriram et al. | .................. 324/96 |
| 5,524,076 A | 6/1996 | Rolland et al. | |
| 5,655,034 A | * 8/1997 | Ishizaka et al. | ................. 385/3 |
| 5,751,867 A | * 5/1998 | Schaffner et al. | ........... 385/132 |
| 5,778,113 A | 7/1998 | Yu | |
| 5,991,471 A | 11/1999 | Yu | |
| 6,052,496 A | 4/2000 | O'Donnell | |
| 6,055,342 A | * 4/2000 | Yi et al. | ........................ 385/15 |
| 6,067,180 A | 5/2000 | Roberts | |
| 6,091,864 A | * 7/2000 | Hofmeister | .................. 359/254 |
| 6,128,424 A | * 10/2000 | Gampp et al. | ................. 385/14 |
| 6,163,637 A | * 12/2000 | Zirngibl | ...................... 359/130 |
| 6,222,966 B1 | * 4/2001 | Khan et al. | ..................... 385/4 |
| 6,236,772 B1 | * 5/2001 | Tavlykaev et al. | ............. 385/2 |
| 2001/0031110 A1 | * 10/2001 | Imajuku et al. | ............... 385/15 |
| 2001/0046341 A1 | * 11/2001 | Nakabayashi | ................ 385/14 |

* cited by examiner

*Primary Examiner*—John D. Lee
*Assistant Examiner*—Tina Lin
(74) *Attorney, Agent, or Firm*—Wendy W. Koba, Esq.

(57) ABSTRACT

A Mach-Zehnder electro-optic modulator is formed that exhibits significantly reduced chirp by utilizing an RF electrode that covers a first waveguide arm in a first region of the modulator and covers the second, remaining waveguide arm in a third region of the modulator (with a second, intermediate region used as a transition area for the electrode). Moving the electrode from one waveguide to the other allows for the chirp created in the third region to essentially "null out" the chirp that accumulated along the first region. Modulation of the optical signal is maintained in the presence of the "electrode switching" by inverting the domain of the optical substrate material in the third region of the modulator.

9 Claims, 2 Drawing Sheets

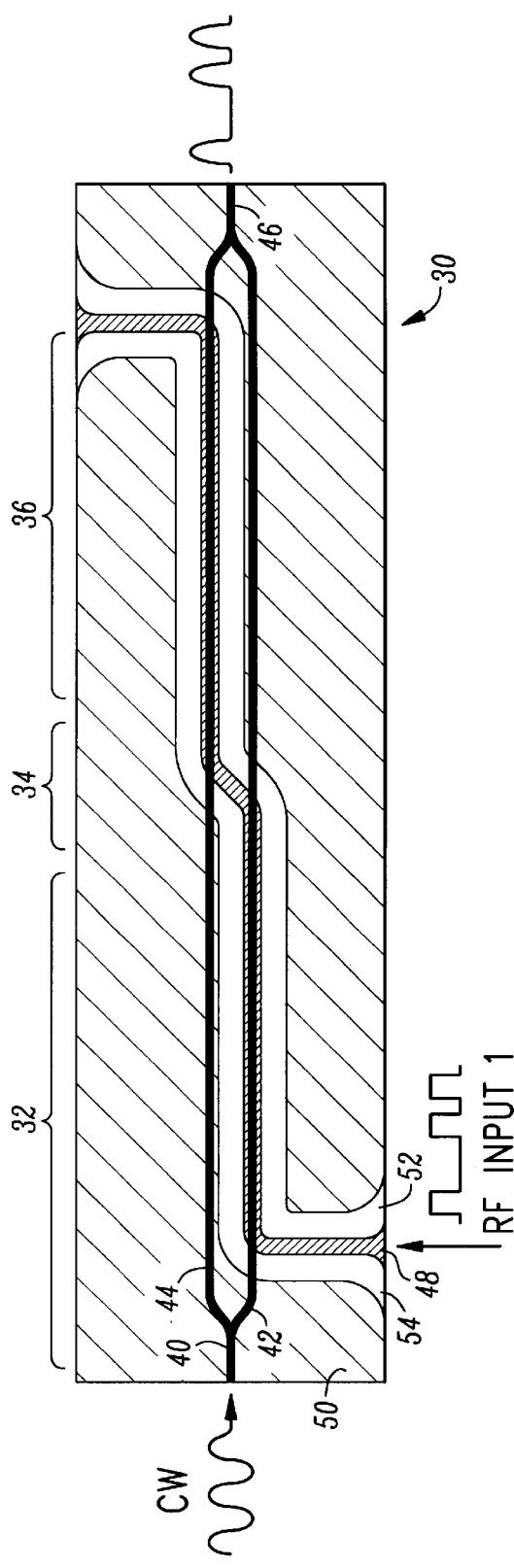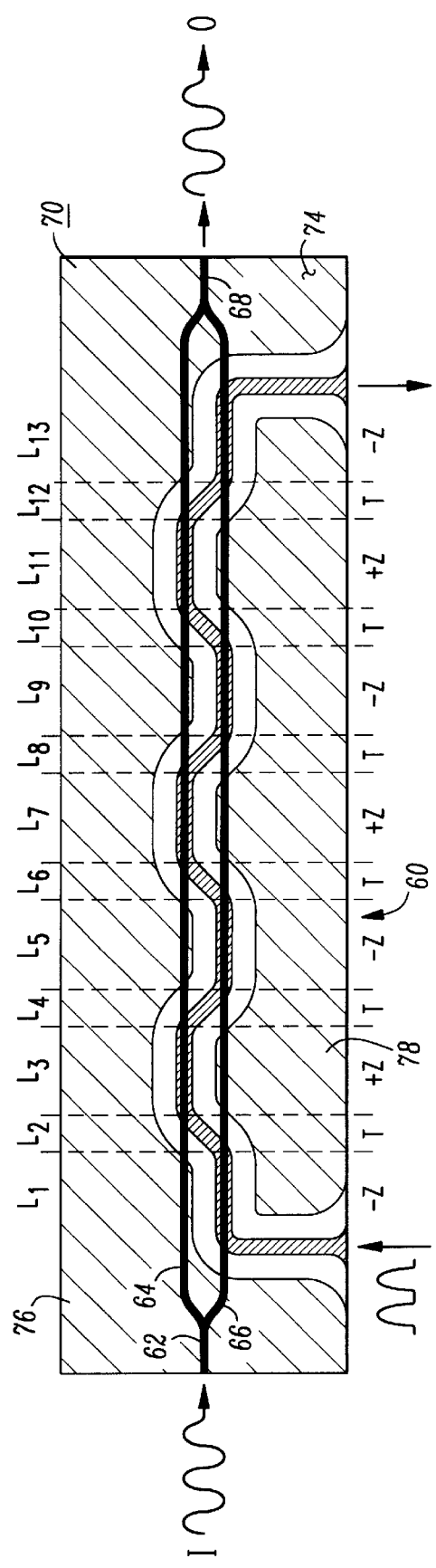

CHIRP COMPENSATED MACH-ZEHNDER ELECTRO-OPTIC MODULATOR

TECHNICAL FIELD

The present invention relates to a Mach-Zehnder electro-optic modulator and, more particularly, to a Mach-Zehnder electro-optic modulator comprising a lithium niobate substrate of alternating domains of appropriate length and number to compensate for device chirp caused by phase differences in the split optical signals passing therethrough.

BACKGROUND OF THE INVENTION

For high bit rate, long haul communications via optical fibers, appropriate light sources serving as the transmitter are essential. Semiconductor lasers can be directly modulated at high speeds and, consequently, are used extensively in optical transmission systems. However, as the demand for increasingly higher bit rates grows (i.e., <10 Gb/s, and in some cases, 40 Gb/s), certain inherent properties of semiconductor lasers come into play. One of these inherent properties is "chirping"-defined as a change in the transmission wavelength as the laser is modulated with a high bit rate input signal.

Better control of transmitter chirp can be realized by using so-called "external" modulation in place of "directly" modulating the semiconductor laser device. In external modulators, a conventional 1.5–1.6 μm semiconductor laser is operated in continuous wave (CW) mode and the continuous output from the laser is externally switched "on" and "off" using an optical modulator to provide the desired high bit rate (binary) optical signal. Often, a Mach-Zehnder interferometer is used as the optical modulator. A Mach-Zehnder interferometer comprises a pair of waveguide channels (also referred to as "arms") connected between an optical waveguide splitter and an optical waveguide combiner. An optical source (such as the CW laser diode) is coupled into the waveguide splitter, which serves as a Y-branch splitter or directional coupler. The two light beams from the splitter propagate through the pair of waveguide channels and are reunited (combined) by the waveguide combiner. Electrodes are disposed over each arm of the pair of waveguide channels and, by providing modulating voltages to one or both electrodes (i.e., the input "data" on/off signal), the relative phases of the two light beams may be altered. In most conventional arrangements, one electrode is held at ground potential and the other is modulated with an electrical RF data signal.

While the use of an external modulator has been found to allow for higher bit rates to be achieved, the lithium niobate substrate material used to form most high speed conventional external modulators can exhibit a phase difference between the two arms of the modulator, introduced by different electric fields being associated with each of the arms. That is, the applied voltage to the electrodes will change the electric field (by different amounts) in the lithium niobate substrate material directly underneath both the RF electrode and the ground plane. With a different electric field on each waveguide channel, therefore, the effective index changes in each arm will differ, introducing a phase difference (i.e., "chirp") into the output signal.

Thus, a need remains in the art for a Mach-Zehnder electro-optic modulator arrangement that is capable of providing the high bit rate throughput necessary for current and future communication applications, yet does not introduce an undesired amount of chirp into the optical output signal.

SUMMARY OF THE INVENTION

The need remaining in the prior art is addressed by the present invention, which relates to a Mach-Zehnder electro-optic modulator and, more particularly, to a Mach-Zehnder electro-optic modulator comprising a lithium niobate substrate of alternating ferroelectric domains to compensate for optical phase differences between the optically split signals passing through the two arms of the Mach-Zehnder modulator.

In accordance with the present invention, a single-ended Mach-Zehnder electro-optic modulator is formed to include three separate regions disposed in tandem. The first region is similar to a conventional Mach-Zehnder electro-optic modulator and includes a pair of spaced-apart arms, with a "ground plane" electrode disposed over a first waveguide and an RF electrode carrying the modulating signal (also referred to as the "hot" electrode) disposed over the second, remaining waveguide. A second, relatively short, transition region is disposed immediately after the first region. The electrode configuration is transitioned in this second region so that the RF electrode is positioned over the first waveguide at the output of the second region and the ground plane is positioned over the second waveguide. A third region, comprising lithium niobate substrate material having its domain inverted with respect to the first region, is disposed after the second region, where the RF electrode is maintained over the first waveguide and the ground electrode over the second waveguide.

The arrangement of the present invention results in introducing a positive "total optical path length difference" (TOPD), also referred to as chirp, between the pair of optical signals exiting the first region (which would result in signal chirp if the signals were recombined and the device output taken at this point). However, an opposite TOPD is exhibited in the third region. Therefore, with proper control of the combination of the first, second and third regions, the TOPD can be made to be essentially zero. As long as the optical path lengths of the waveguides in the first and third regions are essentially the same, the positive and negative values of TOPD will cancel and essentially eliminate most of the chirp in the optical output signal. The use of the domain inverted lithium niobate substrate in the third region preserves the modulation on the optical output signal, since the electrode location is switched between the first and third regions. Therefore, the combination of moving the RF electrode with inverting the domain in one region of the modulator results in a Mach-Zehnder device with greatly reduced chirp.

In another embodiment of the present invention, a predefined amount of "chirp" (which is useful in some applications) can be introduced by modifying the physical length of either the first region, the third region, or both the first and third regions.

It is an aspect of the present invention that multiple transition and "domain inverted" regions can be cascaded along the length of the optical substrate to form a device which alternates between "positive" TOPD and "negative" TOPD, allowing for improved control of the amount of chirp in the optical output signal.

Other and further aspects and embodiments of the present invention will become apparent during the course of the following discussion and by reference to the accompanying drawings.

BRIEF DESCRIPTION OF THE DRAWINGS

Referring now to the drawings,

FIG. 2 illustrates an exemplary chirp reduced single-ended Mach-Zehnder electro-optic modulator formed in accordance with the present invention; and FIG. 3 contains a simplified diagram of an alternative embodiment of the present invention, using multiple cascaded transition and domain inverted regions along the length of the optical substrate.

DETAILED DESCRIPTION

Figure 1:
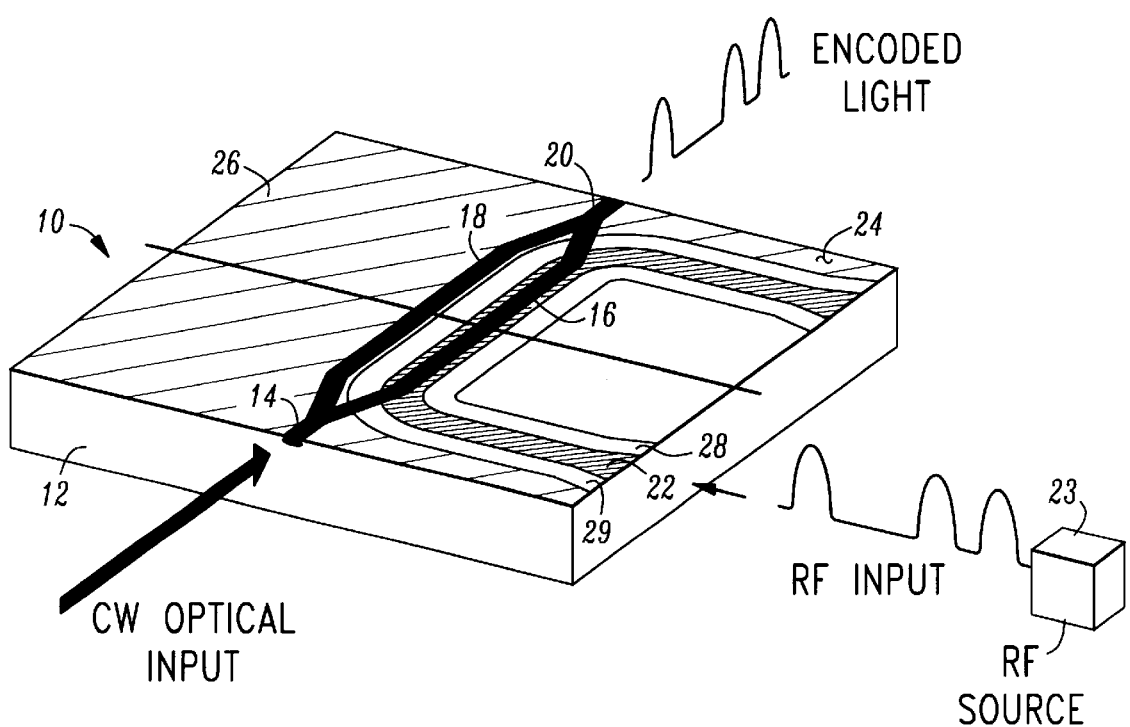
FIG. 1 illustrates an exemplary prior art single-ended Mach-Zehnder electro-optic modulator.

FIG. 1 contains an isometric view of a prior art single-ended Mach-Zehnder modulator 10. Modulator 10 is formed in an opto-electronic substrate 12 (for example, lithium niobate) and comprises an input waveguide section 14 including a 3 dB coupler that splits the waveguide into a pair of parallel waveguide arms 16, 18. Waveguide arms 16,18 are formed to comprise a predetermined length L, where the individual arms then recombine into an output waveguide section 20. In order to provide the modulator function, an input laser device (not shown) is used to launch a continuous wave (CW) input optical signal into input waveguide section 14. A modulation input (data) signal (i.e., an electrical RF signal) from an RF source 23 is provided as the RF input to modulate the CW input optical signal and produce a data-encoded optical output signal. In particular, prior art modulator 10 is formed to include a first electrode 22 disposed on surface 24 of substrate 12 so as to overly parallel waveguide arm 16. The remaining area of top surface 24 is covered with a ground electrode 26, except for isolation regions 28 and 29, used to maintain electrical isolation between electrodes 22 and 26. Therefore, as shown in FIG. 1, ground plane electrode 26 will overly second waveguide arm 18 of the pair of waveguide arms. First electrode 22 is electrically connected to RF signal source 23, thus providing for the modification of the electric fields along the length of first waveguide arm 16 and second waveguide arm 18.

This particular arrangement of holding one electrode at ground and applying an RF signal to the remaining electrode allows for the modulator drive voltage to be kept relatively low. However, waveguide arms 16 and 18 will experience different amounts of phase shift and therefore be defined as comprising different optical path lengths. This difference in phase shift is due to the presence of the RF ("hot") electrode 22 over waveguide arm 16, causing optical waveguide 16 to "see" a larger electric field (as well as a larger optical index change) than optical waveguide 18 (disposed under second, ground, electrode 26). When the two optical signals propagating along waveguides 16 and 18 recombine in output waveguide region 20, the resulting phase of the output light can be thought of as the average of the optical phase in each arm 16, 18 (as long as waveguides 16 and 18 exhibit similar optical propagation loss characteristics). Or stated similarly, the total optical path length of the device can be thought of as the average of the two optical path lengths through the device. In particular, the change in optical path length of waveguide 16 is defined as $\Delta n_1 * L_1$ and the change in optical path length of waveguide 18 is defined as $\Delta n_2 * L_2$, where $\Delta n_1$ and $\Delta n_2$ are the effective refractive index changes in waveguides 16, 18 as a result of the application of the RF signal to first electrode 22, and $L_1$ and $L_2$ are the physical lengths of parallel waveguide arms 16, 18.

In most cases, as is shown in FIG. 1, $L_1=L_2=L$. The "total optical path difference" (TOPD) resulting from the RF signal/optical waveguide overlap in prior art modulator 10 can then be defined as follows:

$$TOPD = ((|\Delta n_1| * L_1) - (|\Delta n_2| * L_2))/2$$
$$= L/2 * (|\Delta n_1| - |\Delta n_2|).$$

For a conventional single-ended prior art modulator 10 as shown in FIG. 1, $|\Delta n_1|$ is approximately equal to $4*|\Delta n_2|$. Given that $\Delta n_1$ and $\Delta n_2$ are dependent on the magnitude of the applied RF voltage, it can be seen that the TOPD changes as the modulator is switched between the "on" and "off" state. Therefore, the phase of the output optical signal changes as the optical signal throughput of the modulator changes. This is the physical source of "chirp" in the conventional single-ended optical modulator.

The change in phase of the optical signal, and hence the chirp in the output signal, is greatly reduced in accordance with the present invention by using a multiple stage Mach-Zehnder modulator of the present invention, which includes a "domain inverted" region that essentially "undoes" the chirp introduced in an arrangement such as that described above in association with FIG. 1. In particular, FIG. 2 contains a top view of an exemplary Mach-Zehnder modulator 30 formed in accordance with the present invention, where modulator 30 comprises a first region 32 similar to prior art modulator designs, a second transition region 34, and a third region 36, where the ferroelectric domain of the substrate material is inverted in third region 36 to compensate for the unbalanced phase changes experienced by the optical signals in first region 32.

As shown, the optical waveguiding areas within modulator 30 include an input optical waveguide 40 (responsive to an input CW optical signal), parallel waveguide arms 42 and 44 branching off of input waveguide 40, and an output optical waveguide 46 (joining together the optical signals propagating along arms 42, 44). An RF electrode 48 is shown as disposed to overly first waveguide arm 42 in first region 32 of modulator 30. A ground plane electrode 50 is formed as shown to cover the remaining surface area of first region 32, except for a pair of isolation regions 52, 54 that are used to maintain electrical separation between RF electrode 48 and ground plane electrode 50. In first region 32, therefore, an input RF electrical signal will modify the refractive index ($\Delta n_1$) in the vicinity of first waveguide arm 42 more than the refractive index ($\Delta n_2$) associated with second waveguide 44 will be modified. This arrangement will then introduce a positive (or negative) value of TOPD in first region 32 (i.e., $|\Delta n_1|>|\Delta n_2|$), a "positive" change if $\Delta n_1>\Delta n_2$, or a "negative" change if $\Delta n_1<\Delta n_2$. First waveguide arm 42 will therefore experience an advancement (or retardation) of optical phase in first region 32 by virtue of being located under the "hot" RF electrode 48, thus reducing (or increasing) the effective optical path length, while second waveguide arm 44 will experience a retardation (or advancement) of optical phase (due to the presence of ground plane electrode 50)—an increase (or decrease) in the effective optical path length.

Transition region 34 of modulator 30 is formed to shift the position of first electrode 48 from overlying first waveguide arm 42 to overlying second waveguide arm 44. That is, first electrode 48 is shown in transition region 34 to curve away from first waveguide arm 42 and, by the end of transition region 34, first electrode 48 will overly second waveguide arm 44. At the same time, ground plane electrode 50 is also modified such that electrode 50 will overly first waveguide arm 42 in third region 36 of modulator 30. The consistent movement of both electrodes along transition region 34 results in introducing no additional optical path length delay.

As mentioned above, modulator 30 of the present invention is formed in a manner such that the domain of the substrate material in third region 36 is inverted with respect to the domain of the substrate material in first region 32 (indicated by the shading of third region 36). By inverting the domain of the substrate material in accordance with the present invention, an optical phase shift (i.e., change in optical path length) that is the opposite of that generated in first region 32 will be produced, using the same electrical field in each region. Therefore, the movement of the RF ("hot") electrode 48 to second arm 44, coupled with the inverted domain, results in preserving the modulation characteristic of the device (e.g., the phase along first arm 42 remains "advanced" with respect to second arm 44) while canceling out the chirp present in the signal at the output of first region 32. The movement of RF electrode 48 to be disposed over second arm 44 results in increasing the change in refractive index in this area so that $|\Delta n_2| > |\Delta n_1|$, producing a TOPD with a negative (or positive) value, essentially equal to the positive (or negative) value in first region 32. The domain inversion, coupled with the electrode movement, results in the phase front along first waveguide arm 42 to be further advanced (i.e., further decreasing the optical path length) and the phase front along second waveguide arm 44 to be further retarded (i.e., further increasing the optical path length). The capability to maintain this difference in optical path length in the presence of the electrode movement from one waveguide to the other is critical in maintaining the modulating characteristic of the device.

Modulator 30 of the present invention, as illustrated in FIG. 2, is constructed to be essentially a symmetric device. That is, the change in optical path length of the waveguide arms in first section 32 and third section 36 are balanced such that change is equal and opposite to that experienced in sections 42 and 44, where RF electrode 48 is disposed such that it extends across an appropriate length of the waveguides in each region. This symmetry insures that essentially all of the chirp present in the device will be cancelled. There are some applications, however, where it is desired to maintain a predetermined amount of chirp. In this situation, it is possible to control the physical length of RF electrode in first section 32 and third section 36 to create a modulator with a specific amount of chirp.

FIG. 3 illustrates an alternative embodiment of a single-ended, chirp-compensated Mach-Zehnder modulator 60 formed in accordance with the present invention. As mentioned above, an extension of the arrangement as illustrated in FIG. 2 can include multiple transition and domain-inverted regions, cascaded as shown in FIG. 3. In particular, modulator 60 includes an optical waveguide structure similar to that discussed above in association with FIG. 2, including an input coupling section 62, parallel waveguide arms 64, 66, and an output coupling section 68. In operation, a CW optical input signal I is applied to input coupling section 62 and a modulated optical output signal O will exit from output waveguide 68. It is to be understood that this waveguide structure is formed in an appropriate optical substrate material 70, such as lithium niobate. An RF electrode 72 is formed on a top surface 74 of substrate 70 and is configured, in this particular arrangement to first cover a portion of waveguide 66, then transition over a predetermined length $L_2$ to cover a portion of waveguide 64, then transition back (over a predetermined length $L_4$) to again cover a portion of waveguide 66, and so on, as shown.

In accordance with the teachings of the present invention, the domain of the optical substrate material is "inverted" (indicated by the +Z reference) in each location where RF electrode 72 is disposed over waveguide arm 64. A ground plane electrode region 76, 78 is also shown. In this particular structure, the chirp can be controlled in greater refinement, by utilizing additional regions where the domain is inverted, and utilizing shorter regions for both the −Z domain material and the +Z domain material. The transition regions are designated with the letter "T" in this drawing.

Although specific embodiments of the present invention have been described in detail, it will be apparent to one skilled in the art that variations and modifications to the embodiments may be made within the scope of the following claims.

What is claimed is:

1. A Mach-Zehnder electro-optic modulator formed on an optical substrate and responsive to an optical input signal and an RF electrical signal for generating as an output a modulated optical signal, said modulator comprising an input optical waveguide splitter disposed along a surface of said optical substrate, said optical input signal coupled into the splitter, then propagating along a pair of optical waveguide arms from the branches of the splitter;

an output optical waveguide recombiner disposed along said surface of said optical substrate beyond said input optical waveguide splitter, said output optical waveguide recombiner including a pair of optical waveguide arms and at least one output optical port, the pair of optical waveguide arms coupled to the pair of optical waveguide arms extending from said input optical waveguide splitter to form a first waveguide and a second waveguide;

an RF electrode disposed to cover a first predetermined length ($L_1$) of the first waveguide, said RF electrode formed to include a transitional region to shift the position of said RF electrode from said first waveguide to the second waveguide, said RF electrode also disposed to cover a second predetermined length ($L_2$) of the second waveguide;

a ground electrode disposed to cover the first predetermined length of the second waveguide and the second predetermined length of the first waveguide; and the optical substrate material formed to include an inverted domain region in the area where the RF electrode is disposed to cover the second waveguide.

2. The Mach-Zehnder electro-optic modulator as defined in claim 1 wherein the optical substrate comprises lithium niobate.

3. The Mach-Zehnder electro-optic modulator as defined in claim 1 wherein the electro-optically induced phase shift in the first predetermined length of the first and second waveguides is essentially equal to the electro-optically induced phase shift in second predetermined length of said first and second waveguides so as to essentially cancel chirp present in the optical signal.

4. The Mach-Zehnder electro-optic modulator as defined in claim 1 wherein the electro-optically induced phase shift in first predetermined length of the first and second waveguides is not equal to the electro-optically induced phase shift in the second predetermined length of said first and second waveguides so as to impart a predetermined amount of chirp in the output optical signal.

5. The Mach-Zehnder electro-optic modulator as defined in claim 1 wherein the ground electrode is formed as a ground plane to cover the surface of the optical substrate, and the modulator further comprises isolation areas to maintain electrical isolation between said ground plane and the RF electrode.

6. A Mach-Zehnder electro-optic modulator formed on an optical substrate and responsive to an optical input signal and an RF electrical signal for generating as an output a modulated optical signal, said modulator comprising an input optical waveguide splitter disposed along a surface of said optical substrate, said optical input signal coupled into the splitter, then propagating along a pair of optical waveguide arms from the branches of the splitter;

an output optical waveguide recombiner disposed along said surface of said optical substrate beyond said input optical waveguide splitter, said output optical waveguide recombiner including a pair of optical waveguide arms and at least one output optical port, the pair of optical waveguide arms coupled to the pair of optical waveguide arms extending from said input optical waveguide splitter to form a first waveguide and a second waveguide;

an RF electrode disposed to cover alternating lengths of said first waveguide and said second waveguide, with electrode transition regions disposed between the covering of said first waveguide and said second waveguide;

a ground electrode disposed in opposition to said RF electrode over alternating lengths of said first and second waveguides, wherein the optical substrate material is formed to exhibit inverted domain regions in each area where the RF electrode is disposed to cover the second waveguide.

7. The Mach-Zehnder electro-optic modulator of claim 6 wherein the optical substrate comprises lithium niobate.

8. The Mach-Zehnder electro-optic modulator of claim 6 wherein the electro-optically induced phase shift in each section of the first waveguide covered by the RF electrode is essentially equal to the electro-optically induced phase shift in each section of the second waveguide covered by the RF electrode so as to essentially cancel chirp present in the optical signal.

9. The Mach-Zehnder electro-optic modulator of claim 6 wherein the electro-optically induced phase shift in each section of the first waveguide covered by the RF electrode is not equal to the electro-optically induced phase shift in each section of the second waveguide covered by the RF electrode so as to impart a predetermined amount of chirp in the output optical signal.

* * * * *